(12) United States Patent
Vermette et al.

(10) Patent No.: US 8,600,961 B2
(45) Date of Patent: Dec. 3, 2013

(54) DATA SUMMARIZATION INTEGRATION

(75) Inventors: Shane Robert Vermette, San Carlos, CA (US); Vijay Manguluru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/398,301

(22) Filed: Feb. 16, 2012

(65) Prior Publication Data

US 2013/0218856 A1 Aug. 22, 2013

(51) Int. Cl.
*G06F 17/30* (2006.01)

(52) U.S. Cl.
USPC .............................. 707/703; 707/704; 709/201

(58) Field of Classification Search
None
See application file for complete search history.

(56) References Cited

U.S. PATENT DOCUMENTS

| | | | |
|---|---|---|---|
| 6,119,222 A | 9/2000 | Shiell et al. | |
| 6,161,105 A | 12/2000 | Keighan et al. | |
| 6,513,065 B1 | 1/2003 | Hafez et al. | |
| 6,560,647 B1 | 5/2003 | Hafez et al. | |
| 6,748,384 B1 | 6/2004 | Rylander et al. | |
| 6,856,970 B1 | 2/2005 | Campbell et al. | |
| 6,978,265 B2 | 12/2005 | Schumacher | |
| 6,988,271 B2 | 1/2006 | Hunt | |
| 7,281,013 B2 | 10/2007 | Chaudhuri et al. | |
| 7,454,698 B2 | 11/2008 | Kohda et al. | |
| 7,509,684 B2 | 3/2009 | McDonald et al. | |
| 7,958,083 B2 | 6/2011 | Vermette et al. | |
| 7,962,458 B2 * | 6/2011 | Holenstein et al. | 707/704 |
| 7,979,385 B2 | 7/2011 | Vermette et al. | |
| 8,046,779 B2 | 10/2011 | Wusthoff et al. | |
| 2003/0163790 A1 * | 8/2003 | Murata | 715/531 |
| 2005/0066095 A1 | 3/2005 | Mullick et al. | |
| 2005/0262057 A1 | 11/2005 | Lesh et al. | |
| 2008/0077656 A1 * | 3/2008 | Broda | 709/203 |
| 2008/0300872 A1 * | 12/2008 | Basu et al. | 704/235 |
| 2009/0248620 A1 | 10/2009 | Vermette | |
| 2009/0248691 A1 | 10/2009 | Vermette | |
| 2009/0276527 A1 | 11/2009 | Mcclain et al. | |
| 2009/0303901 A1 * | 12/2009 | Duffield et al. | 370/253 |
| 2009/0327290 A1 | 12/2009 | Vermette | |
| 2009/0328043 A1 | 12/2009 | Vermette | |
| 2010/0070448 A1 * | 3/2010 | Omoigui | 706/47 |
| 2010/0332448 A1 * | 12/2010 | Holenstein et al. | 707/615 |
| 2010/0332449 A1 * | 12/2010 | Holenstein et al. | 707/615 |

OTHER PUBLICATIONS

Deborah Rosenberg, "Methods for Summarizing Data", 1998.*
Oracle White Papter-OLAP Option to Oracle Database 11g Release 2, Sep. 2009.*

(Continued)

*Primary Examiner* — Hung Le
(74) *Attorney, Agent, or Firm* — Kilpatrick Townsend & Stockton LLP

(57) ABSTRACT

Embodiments of the invention provide systems and methods for providing summarizations of data and transactions based on the status of the summarization and the data and transactions being summarized. According to one embodiment, a method for providing summarizations of data and transactions related to one or more applications can comprise initiating a first summarization of the data and transactions related to the one or more applications. The first summarization can be paused in response to a request to evaluate the data and transactions being summarized. Data and transactions available for summarization can be evaluated in response to and based on the request. The first summarization can be resumed upon a completion or a timeout of the evaluating of the data and transactions being summarized.

16 Claims, 11 Drawing Sheets

(56) References Cited

OTHER PUBLICATIONS

Tanin et al, "Hierarchical Data Summarization", 2008.*
U.S. Appl. No. 12/059,811, filed Mar. 31, 2008, Advisory Action mailed Apr. 22, 2011, 3 pages.
U.S. Appl. No. 12/059,811, filed Mar. 31, 2008, Final Office Action mailed Feb. 9, 2011, 14 pages.
U.S. Appl. No. 12/059,811, filed Mar. 31, 2008, Office Action mailed Aug. 10, 2010, 14 pages.
U.S. Appl. No. 12/059,830, filed Mar. 31, 2008, Notice of Allowance mailed Mar. 17, 2011, 10 pages.
U.S. Appl. No. 12/059,830, filed Mar. 31, 2008, Advisory Action mailed Jan. 21, 2011, 2 pages.
U.S. Appl. No. 12/059,830, filed Mar. 31, 2008, Final Office Action mailed Nov. 24, 2010, 12 pages.
U.S. Appl. No. 12/059,830, filed Mar. 31, 2008, Office Action mailed Aug. 24, 2010, 20 pages.
U.S. Appl. No. 12/147,709, filed Jun. 27, 2008, Notice of Allowance mailed Mar. 22, 2011, 14 pages.
U.S. Appl. No. 12/147,709, filed Jun. 27, 2008, Office Action mailed Dec. 16, 2010, 9 pages.
U.S. Appl. No. 12/059,811, filed Mar. 31, 2008, Office Action mailed Aug. 16, 2012, 18 pages.
U.S. Appl. No. 12/147,726, filed Jun. 27, 2008, Office Action mailed Aug. 14, 2012, 12 pages.
U.S. Appl. No. 12/059,811, filed Mar. 31, 2008, Final Office Action mailed Feb. 14, 2013, 26 pages.
U.S. Appl. No. 12/059,811, filed Mar. 31, 2008, Advisory Action mailed Apr. 23, 2013, 3 pages.
U.S. Appl. No. 12/147,726, filed Jun. 27, 2008, Notice of Allowance mailed Nov. 26, 2012, 11 pages.

* cited by examiner

DATA SUMMARIZATION INTEGRATION

BACKGROUND OF THE INVENTION

Embodiments of the present invention relate generally to methods and systems for providing summarizations of data and transactions related to one or more applications and more particularly to methods and systems for providing summarizations of data and transactions based on the status of the summarization and the data and transactions being summarized.

A common business need is to summarize data that exists in a system. This can be accomplished using a summarization program. A summarization program can involve any number of functional data transformations that bring data from an existing state in a system to a state that is ready or closer to being ready to be viewed by an end user, (e.g., in a report). A report may be any entity that displays summarized data to an end user, for example through a reporting dashboard. As the volume of data being summarized increases or the elapsed time to summarize the data increases, it can make sense to break up the functional data transformations into a number of steps. This can also aid in recoverability. However, performing the functional data transformations in a number steps can add complexity to questions asked about the state of such data, since the data can be committed in the database in a variety of states of partial functional transformation.

It sometimes becomes necessary for the summarization program to extract data that may or may not be modified during or after extraction. Furthermore, the type of modifications that can happen on such data may depend on the functional transformations within the summarization program, introducing circular dependencies that while functionally sound, can add complexity to the summarization program. For this reason, it can be desirable to be able to exactly answer a question about source system or summary data within the context of whether the summarization program has read, created and/or modified that data. Another point of integration within the summarization program can exist between technologies. In satisfying the requirements of the functional data transformations it is possible that the transformations span different technologies, for example between a relational database (RDBMS) and a multidimensional database (MDBMS). Inherent to spanning different technologies is that the systems can be fully available at different times. Depending on how the technologies are used, optimizations can be made so to minimize the impact of one of the technologies becoming unavailable.

Previous solutions for handling such summarizations included placing data that is prepared to be summarized into a log so that it becomes static and can be extracted and summarized at any time. However, if the summarization program is closely integrated with the source system, it may become necessary to extract data that is actively a part of the transaction system. Additionally, when a specific flow in the source system depends on the status of summary data, it can be impractical to predict when summarization will be run (potentially changing that status). These previous solutions do not provide a way to exactly determine the state of the summarization data.

Regarding integration between an RDBMS and an MDBMS, previous approaches that pull together different technologies can be at the mercy of those technologies such that if one goes down, everything becomes unavailable. While there is much in the art regarding high availability in a multi-technology system, a program containing functional data transformations such as a summarization program may not be able to take advantage of such methods in the art without taking into consideration its particular data transformations, and as such may therefore still be subject to the problem of technology unavailability. It is also desirable to ensure that when, if ever, the MDBMS becomes available, it is brought in sync with the summary data with less user intervention. Previously, the summarization program would just be unavailable while the MDBMS was unavailable. Similarly, if the data is rejected from the MDBMS for some reason other than technology availability, it may be the case that the summarization program cannot continue past that point, creating a roadblock for other instances of summarization trying to summarize some of the same or similar data. Hence, there is a need for improved methods and systems for providing summarizations of data and transactions related to one or more applications.

BRIEF SUMMARY OF THE INVENTION

Embodiments of the invention provide systems and methods for providing summarizations of data and transactions based on the status of the summarization and the data and transactions being summarized. According to one embodiment, a method for providing summarizations of data and transactions related to one or more applications can comprise initiating a first summarization of the data and transactions related to the one or more applications. The first summarization can be paused in response to a request to evaluate the data and transactions being summarized. Data and transactions available for summarization can be evaluated in response to and based on the request. The first summarization can be resumed upon a completion or a timeout of the evaluating of the data and transactions being summarized. In some cases, a determination can be made as to whether the first summarization is currently paused. In response to determining that the first summarization is currently paused, a further determination can be made as to whether pausing the first summarization has timed out according to a predetermined timeout limit. In response to determining that pausing the first summarization has timed out, an indication that pausing the first summarization has timed out can be recorded.

Pausing the summarization can comprise acquiring a pause identifier for a pause instance of the first summarization. Parameters passed to the pause instance can be translated to a scope of the pause instance. An exclusive lock can be obtained on the scope of the pause instance. A determination can be made as to whether one or more second summarizations overlap with the pause instance. In response to determining that one or more other summarizations overlap with the pause instance, a pause indicator for the one or more second summarizations can be set and the exclusive lock on the scope of the pause instance can be released.

Evaluating the data and transactions being summarized can comprise receiving the request to evaluate the data and transactions being summarized. The request can include a pause identifier. A determination can be made as to whether the pause identifier from the request is a valid pause identifier for the pause instance of the first summarization. In response to determining the pause identifier from the request is a valid pause identifier for the pause instance of the first summarization, an evaluation identified in the request can be executed.

Resuming the first summarization can comprise receiving a request to resume the first summarization, and any other summarizations affected by the pause. The request can include a pause identifier. A determination can be made as to whether the pause identifier from the request is a valid pause identifier for the pause instance of the first summarization. In response to determining the pause identifier from the request is a valid pause identifier for the pause instance of the first summarization, any pause indicators for pause instances with the same pause identifier can be deleted and the exclusive lock on the scope of the pause instance can be released.

Executing the first summarization can further comprise populating in a queue the first summarization instance with data to be exposed in the first summarization. The queue can comprise data to be exposed in one or more summarizations. An event can be created for exposing the data in the first summarization. Upon a failure of the first summarization or a timeout of the event for exposing the data in the first summarization, the data to be exposed in the first summarization can be copied from the queue to a quarantine. The queue of data to be exposed can be processed. Upon completion of processing the queue of data to exposed, data from the quarantine in a same scope as the first summarization can be processed. Upon completion of processing data from the quarantine in the same scope as the first summarization, all data from the quarantine can be processed and then it can be purged from the quarantine. It should be noted the data need not be physically moved into the queue to again attempt to process it. Also, the processing for the data from the quarantine is not necessarily synchronous with the execution of the first summarization, i.e., the first summarization doesn't have to wait for the rest of the data in the quarantine to be processed if its data is already processed.

It should also be noted that the first summarization doesn't need to exist for a pause to be instantiated in response to a request to evaluate the data and transactions potentially being summarized. Rather, in some cases, the pause can be instantiated before any summarizations. Therefore, according to another embodiment, a method for providing summarizations of data and transactions related to one or more applications can comprise issuing a pause in response to a request to evaluate the data and transactions being summarized. A first summarization of the data and transactions related to the one or more applications may later be initiated but the pause can be enforced on the first summarization. Data and transactions available for summarization can be evaluated in response to and based on the request and the pause can be released. Releasing the pause can include resuming summarization upon a completion or a timeout of the evaluating of the data and transactions being summarized. That is, in some cases, a determination can be made as to whether the pause has timed out according to a predetermined timeout limit and in response to determining that pause has timed out, an indication can be recorded that the pause on the first summarization has timed out.

Issuing a pause can comprise acquiring a pause identifier for a pause instance and setting an exclusive lock on a scope of the pause instance. A determination can be made as to whether one or more summarizations overlap with the scope of the pause instance. In response to determining that one or more summarizations overlap with the pause instance, a pause indicator can be set for the one or more summarizations and the exclusive lock on the scope of the pause instance can be released.

Evaluating the data and transactions being summarized can comprise receiving the request to evaluate the data and transactions being summarized. The request can include a pause identifier. A determination can be made as to whether the pause identifier from the request is a valid pause identifier for the pause instance. In response to determining the pause identifier from the request is a valid pause identifier for the pause instance, an evaluation identified in the request can be executed.

According to another embodiment, a system can comprise a processor and a memory communicatively coupled with and readable by the processor. The memory can have stored therein a sequence of instructions which, when executed by the processor, cause the processor to provide summarizations of data and transactions related to one or more applications by initiating a first summarization of the data and transactions related to the one or more applications. The first summarization can be paused in response to a request to evaluate the data and transactions being summarized. Data and transactions available for summarization can be evaluated in response to and based on the request. The first summarization can be resumed upon a completion or a timeout of the evaluating of the data and transactions being summarized. In some cases, a determination can be made as to whether the first summarization is currently paused. In response to determining that the first summarization is currently paused, a further determination can be made as to whether pausing the first summarization has timed out according to a predetermined timeout limit. In response to determining that pausing the first summarization has timed out, an indication that pausing the first summarization has timed out can be recorded.

DETAILED DESCRIPTION OF THE INVENTION

Figure 1:
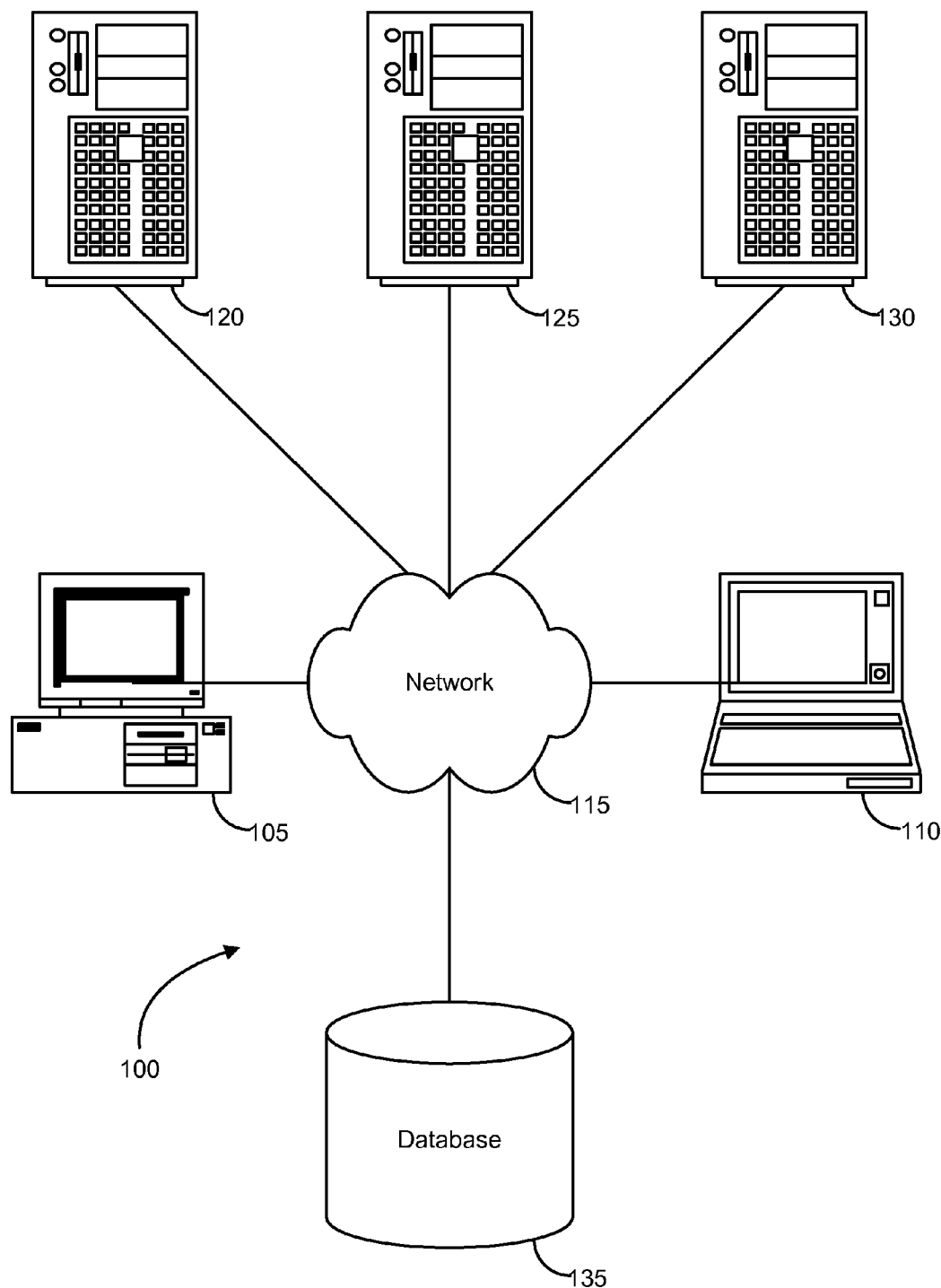
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing summarizations of data and transactions based on the status of the summarization and the data and transactions being summarized. More specifically, embodiments of the present invention can comprise providing data summarization with: a general pause mechanism, a resume mechanism, methods for evaluating the state of summary data while paused, and recovery from abandoned pauses. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
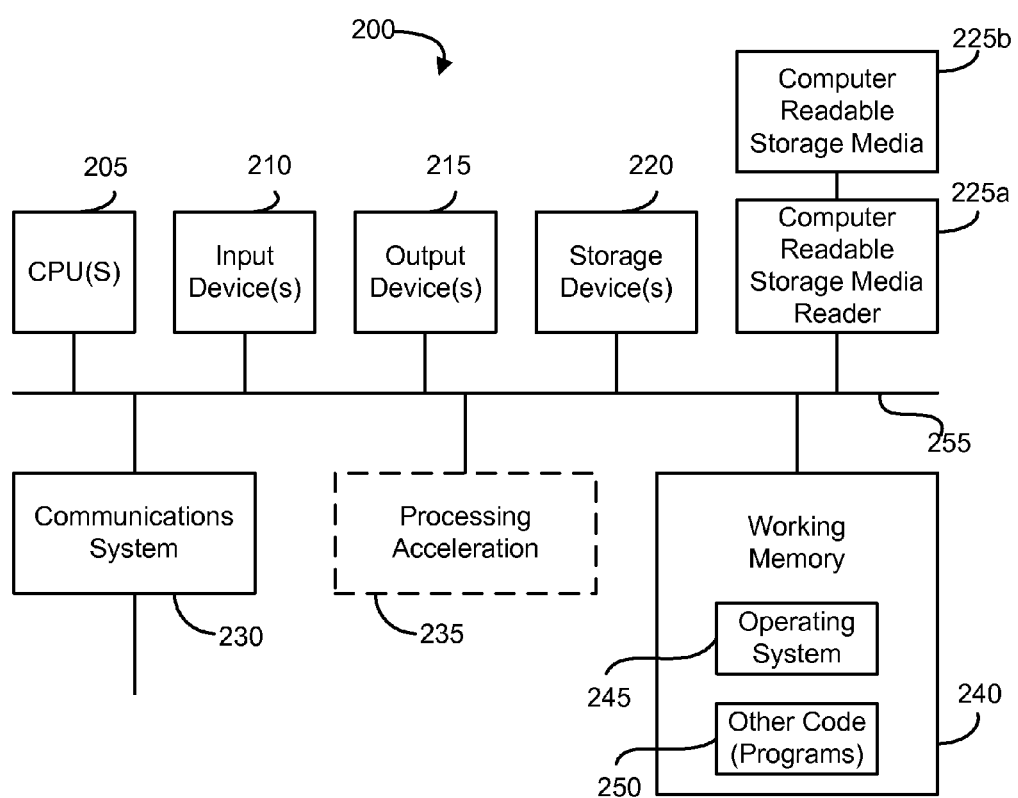
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
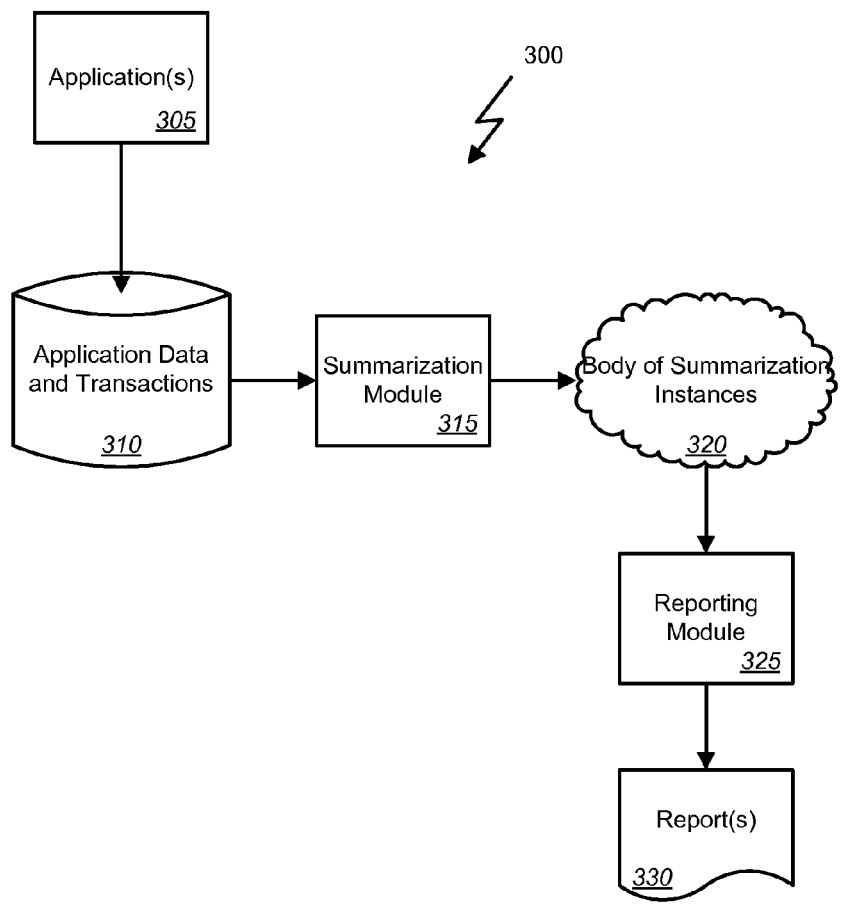
FIG. 3 is a block diagram illustrating, at a high-level, functional components of a system for providing summarization integration according to one embodiment of the present invention.

FIG. 3 is a block diagram illustrating, at a high-level, functional components of a system for providing summarization integration according to one embodiment of the present invention. In this example, the system 300 can include one or more applications 305 for processing data and/or transactions including but not limited to any of a variety of different enterprise applications. These applications 305 can store and maintain the data and transactions in one or more repositories 312 and 31 such as a relational database (RDBMS) 312 and/or a multidimensional database (MDBMS) 314. A summarization module 315 or program can access the repositories 312 and 314 and generate a body of summarization instances 320 that include data transformations that bring the data stored in the repositories 312 and 314 to a state that can be viewed by an end user, (e.g., in a report 330 presented by a reporting module). The report 330 may be any form that displays summarized data to an end user, for example through a reporting dashboard of a user interface for the application 305.

Figure 4:
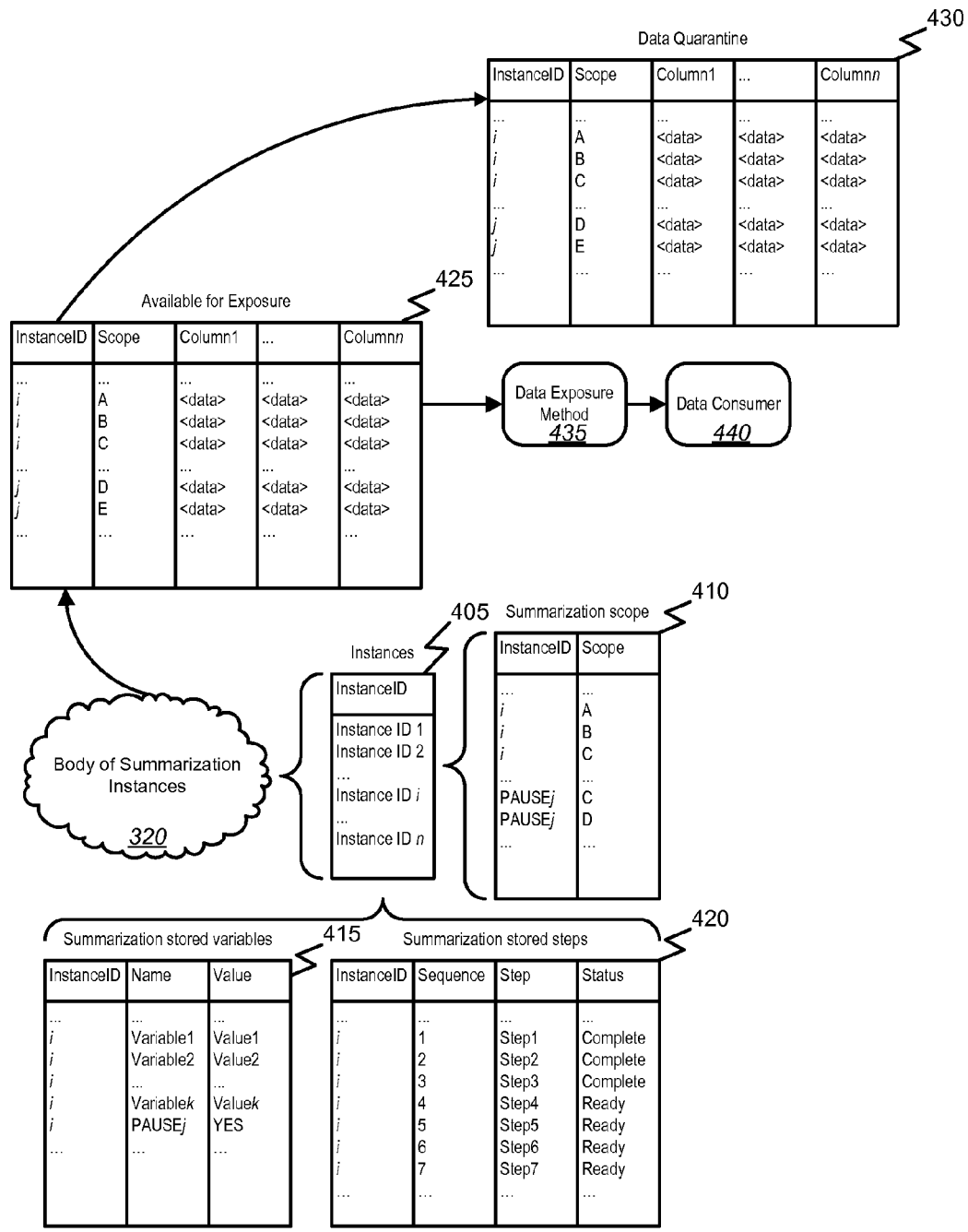
FIG. 4 is a block diagram illustrating sets of data utilized by a system for providing summarization integration and quarantine of data during summarization according to one embodiment of the present invention.

FIG. 4 is a block diagram illustrating sets of data utilized by a system for providing summarization integration and quarantine of data during summarization according to one embodiment of the present invention. This example illustrates additional details of the body of summarization instances 320 introduced above that maybe generated by the summarization module 315 and used by the reporting module 325 to generate one or more reports 330. As illustrated here, the body of summarization instances 320 can include any number of instances 405, each having a corresponding instance identifier. Other information for each instance and related thereto based on the instance identifier can include a defined summarization scope 410, a set of stored summarization variables 415, and a stored set of summarization steps 420.

Generally speaking, an instance of summarization can contain any number of database transactions to be executed in serial and parallel, each satisfying some portion of a set of functional data transformations. Consider a particular summarization instance which can have InstanceID "i." This instance of summarization can be one instance among all existing summarization instances 320. At any time, multiple users can attempt to instantiate summarization so, for example, to bring their data into the reporting dashboard. These attempts can add to the body of summarization instances 320.

For the instance of summarization i, in becoming an instance of summarization it has a particular scope 410 defined, which can be a list of elements unique among all instances of summarization and is used to identify the data in the source system on which to execute the functional data transformations. The instance of summarization i then proceeds to summarize data for its elements of "Scope", for example "A", "B" and "C" in 410. Each summarization instance can maintain state in the RDBMS 312, the list of summarization stored variables 415 and the list of steps corresponding to portions of functional data transformations summarization stored steps 420. The stored steps 420 can be executed in sequence and if they are all completed then the state for summarization instance i can be removed from the RDBMS 312, in which case i would no longer be an instance of summarization.

However, in some situations, summarization instance i may have in its scope some data about which a process, such as one of the applications 305, requests a specific answer, and that the answer can change depending upon which of the summarization stored steps 420 i has completed. Then the process or application 305 can pause summarization instance i, in order to ascertain the answer. Generally speaking, instantiating a pause can be performed by obtaining an ID, for example "j", which can be used to identify the pause instance on a particular scope. In some cases, the total number of pauses that are allowed to exist at any one time can be affected by imposed limits and/or practical resource limits. Parameters passed to the pause instantiation can be translated into what will be the scope for that pause instance. The scope for the pause instance can be stored in the summarization scope data 410 as is used by instances of summarization 320, with a unique ID differentiating pause instances from summarization instances. An exclusive lock can be obtained such that no new instance of summarization can be created on the scope the pause instance wishes to pause. Once the scope of the pause instance is determined, it can then be compared to other existing summarization instances to see if it overlaps with any of them. For each summarization instance that overlaps with the pause instance, for example summarization instance i, insert into the list of stored variables 415 for that summarization instance a variable that indicates that the summarization instance should pause, for example "PAUSEj" in summarization stored variables 415. The variable can include the ID of the pause instance since multiple pauses can exist and can affect a single instance of summarization. Once the pause is committed into the summarization instances' stored variables 415 the scope of the pause instance is committed into the scope table, there is no need to further hold the exclusive lock which can be released by the commit. This pause process is also outlined in and described below with reference to FIG. 6.

At this point, other summarization instances should not progress on any scope in the pause instance. However since the lock has been released, summarization instances that do not overlap with the pause instance can continue as normal. An instance of summarization i can perform a check before executing each step to determine if any pause has been instantiated on scope that overlaps with the scope of summarization instance i. If a pause is in effect, summarization instance i should wait, periodically polling the pause status, until no more pauses remain. The start date and time when the summarization process first started waiting for a pause can be recorded for that pause if it has not already been recorded by a different summarization instance. If the cumulative time instance i has spent waiting on pauses lasts sufficiently long, the summarization instance can timeout, indicating in the summarization stored variables 415 that the pauses have timed out. Once the summarization instance is no longer waiting on a pause, it can continue as normal. This process for handling or enforcing a pause is also outlined in and described below with reference to FIG. 9.

After instantiating a pause and acquiring a pause ID, additional information about the state of summarization data can be discerned by performing an evaluation thereon within a window of time before a timeout occurs. Any number of questions can be asked and answered about summarization data by evaluation processes. For example, the various queries can be executed, filters and/or rules can be applied, processes and/or applications can be executed using the summarization data of a paused summarization instance. The evaluation to be performed can be requested or performed, for example, by the application 305, the reporting module 325, or by another application or module. An exemplary process for evaluating a summarization is also outlined in and described below with reference to FIG. 7.

Once, a pause expires or times out, an evaluation is completed, as requested by the application 305 or on another condition, summarization instances affected by a pause can be resumed. Resuming a summarization can comprise deleting from the summarization scope data 410 and from the summarization stored variables 415 entries for the current pause instance. Once a state from the pause instance is deleted, overlapping summarization instances can continue as normal. This resume process is also outlined in and described below with reference to FIG. 8. According to one embodiment, the pause/resume processes can be implemented in a framework such that when a new need to evaluate arises, focus can be on the functional needs of the evaluation itself, rather than the pause and resume methods which can be implemented separately.

Embodiments of the present invention can also include a process for recovering from abandoned pauses. An abandoned pause can be any pause instance which is never cleaned up, that is, which has never had its state deleted from the database. Inherent to the pause and resume methods, there should not exist a situation in which an instance of summarization will remain paused forever, since any paused summarization instance can timeout on a pause and continue as normal. However if a pause instance is abandoned, if the process that instantiated the pause fails elsewhere for any reason, then there is no longer any dedicated process to clean up the pause instance. According to one embodiment, the duty to clean up abandoned pauses can be left to the summarization instances themselves that overlap with the abandoned pause. When an instance of summarization determines that it is affected by a pause, it can wait for that pause and then timeout on that pause. The cumulative wait time of summarization instances on the pause can be recorded, in the form of each summarization instance attempting to record the date and time it started waiting if it has not already been recorded, and the pause can be cleaned up after a suitable timeout. This can result in returning or raising an error if the pause had not actually been abandoned. The process attempting to instantiate a pause can be aware of this possibility. Since the state maintained for a pause is very light, then the cleanup of a pause is efficient and does not adversely affect the performance of a summarization instance. The duration of a timeout on a pause can vary widely based on functional needs. The balance between how long a timeout can be held before it is considered to be abandoned, and how long a given summarization instance should wait for a pause, and how long it will take to perform an evaluation can be considered at design time, and can be configurable as needed.

As introduced above, the reporting module 325 can display data from both the RDBMS 312 and from the MDBMS 314. This data can be brought into the report 330 or a dashboard by the summarization module 315. However, the summarization module 315 can also, in some cases, provide summary data for other processes and endpoints. Since the RDBMS 312 and the MDBMS 314 are separate and different, it can happen that one or both technologies encounter some setup or environment issue up to and including a plug-pull. If, for example, it is the case that the RDBMS 312 is available, and the MDBMS 314 is not, then it is desirable to allow flows that depend on the summarization module's 315 RDBMS summary data (and not the MDBMS summary data) to continue as if nothing is wrong.

According to one embodiment, the unavailability of one of the repositories 312 or 314 can be addressed using a quarantine. Generally speaking, summarization instances to be made available for exposure to a data consumer 440 through a data exposure method 435 of the reporting module 325 can be placed into a queue 425. If, for example, the MDBMS 314 is not available while an instance of summarization is running, then the summarization module 315 can detect the problem, and place the summary data that was to be loaded to the MDBMS 314 into a quarantine 430 pending the next time the MDBMS 314 becomes available. After the quarantine, the summarization module 315 continues operations that it can continue without causing data corruption, and reports the MDBMS 314 problem to the user. A user can continue to use the summarization module 315 as normal, but without seeing the summary data that would be in the MDBMS but that was quarantined, and each time the summarization module 315 will re-attempt to load the quarantined 430 summary data into the MDBMS 314. When the MDBMS 314 becomes available, a new instance of summarization can take priority and get its data loaded first to the MDBMS 314. At that point that particular instance of summarization no longer needs to wait since its data has been loaded to the MDBMS 314. Since a successful MDBMS 314 data load has happened, then data that was previously quarantined can be asynchronously loaded from the quarantine 430 to the queue 425 for exposure, however the data need not be physically moved to be exposed.

To further illustrate this quarantine process, consider an instance of summarization i that has, as a subset of its steps, some number of steps for loading data into a data consumer such as the MDBMS 314. One of the steps can put data into one or more tables making it eligible for exposure to the data consumer. A queue 425 can be implemented to prioritize and combine requests to load data into the data consumer. So, summarization instance i populates data into a table in the queue 425, making it eligible for exposure to the data consumer 440. Instance i creates an event in the queue of requests to load data to the data consumer 440. Instance i waits for the event to be processed or after a suitable amount of time, i can time out. If nothing goes wrong and summarization instance i completes before timing out, summarization instance i can determine that the data load was successful and continue as normal to its next step. However, if instance i times out, or if the data does not get loaded to the data consumer 440 for some reason, then the data of that instance can be copied into the quarantine 430. According to one embodiment, the data can be copied (rather than moved) so that it will remain in its original location of the queue 425 for continuing on in the summarization program as though the load to the data consumer had been successful. Summarization instance i can continue as normal, and the user can be notified that the data consumer 440 load failed. In this way the only summary data that is unavailable is the summary data in the data consumer 440.

Priority of requests to load data to the data consumer 440 can be given to new instances of summarization, before attempts are made to load data from the quarantine 430. Note that if a summarization instance's data is successfully loaded then the instance will continue as normal, regardless of what the asynchronous queue 425 and quarantine methods do to recover previously quarantined data. The data can be copied to the separate quarantine 430, so that when summarization instance i is completed, the slot that i was using can be freed for a new instance of summarization. The queue 425 can mark any queue events that have been successfully processed as having been processed so that a summarization instance can know when to continue. Then, once new requests are complete, an attempt can be made to load data from the quarantine 430 that is in the scope of the new summarization instance requests. According to one embodiment, the data can be placed in the quarantine 430 such that it can be selectively exposed to the data consumer 440 without the need for expensive operations such as moving or re-copying the data. Upon a successful data load, the user can be notified that the data has finally made it into the data consumer 440. Once in-scope data load quarantine requests are complete, attempts can be made to load data from the rest of quarantine 430. In general, if a successful data load to the consumer 440 has taken place, then the data consumer 440 is likely to be fully available, so all previously quarantined data can be attempted. Data that is successfully loaded from the quarantine 430 to the data consumer 440 can be purged from the quarantine 430. Exemplary processes for quarantining summarization data are also outlined in and described below with reference to FIGS. 10 and 11.

Figure 5:
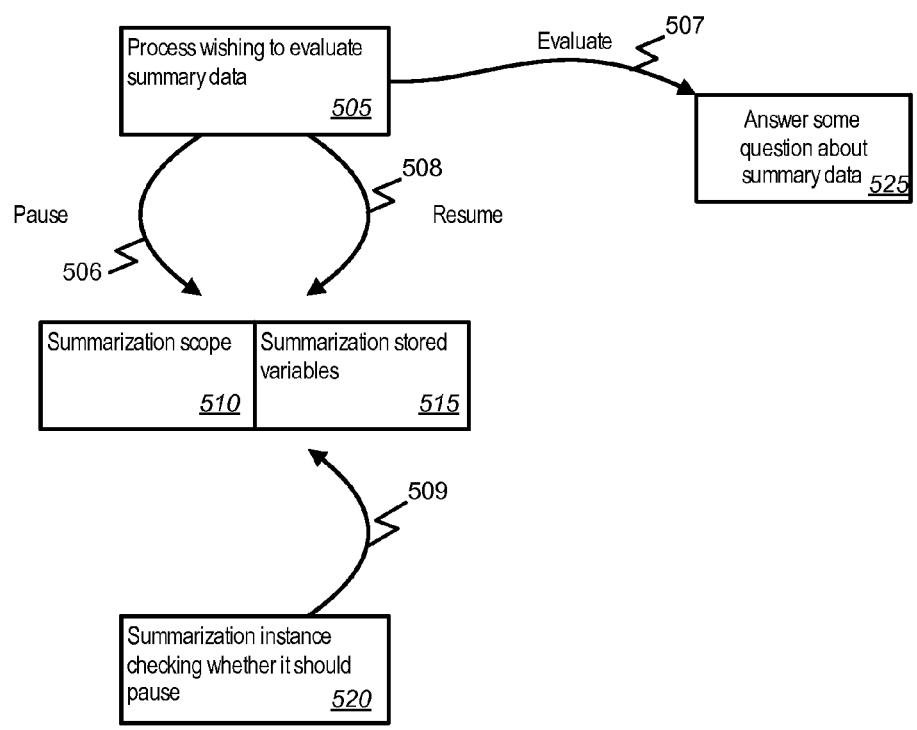
FIG. 5 is a block diagram illustrating various processes for providing summarization integration according to one embodiment of the present invention.

FIG. 5 is a block diagram illustrating various processes for providing summarization integration according to one embodiment of the present invention. As illustrated here, an application 505 or process wishing to evaluate summary data can request 506 a pause of a summarization process. The pause can be applied to the scope 510 of the summarization and variables 515 for the paused summarization can be stored. The application 505 can also request 507 an evaluation of the summary data. Upon this request 507, an identified evaluation, e.g., a query, a filter, a rule, another process, can be performed 525 on the summary data. Upon completion or timeout of the evaluation 525 or upon another event or condition, the application 505 can resume 508 the summarization. Additionally, other summarization processes 520 or instances may periodically or upon some request or other condition check 509 the paused instances and enforce the pause on any overlapping scope.

Stated another way, providing summarizations of data and transactions related to one or more applications 505 can comprise initiating 510 and 515 a first summarization of the data and transactions related to the one or more applications 505. The first summarization can be paused 506, for example, in response to a request 507 to evaluate the data and transactions being summarized. Additional details of an exemplary process for pausing a summarization will be described below with reference to FIG. 6. The data and transactions being summarized can be evaluated 525 in response to and based on the request 507. Additional details of an exemplary process for evaluating summarization data will be described below with reference to FIG. 7. The first summarization can then be resumed 508 upon a completion or a timeout of the evaluating 525 of the data and transactions being summarized. Additional details of an exemplary process for resuming a summarization will be described below with reference to FIG. 8. Also, the pause can be checked periodically or upon some request or other condition to enforce and properly process any currently paused summarizations. Additional details of an exemplary process for handling a paused summarization will be described below with reference to FIG. 9.

It should also be noted that the first summarization doesn't need to exist for a pause to be instantiated in response to a request to evaluate the data and transactions potentially being summarized. Rather, in some cases, the pause can be instantiated before any summarizations. Therefore, according to another embodiment, a method for providing summarizations of data and transactions related to one or more applications can comprise issuing a pause in response to a request to evaluate the data and transactions being summarized. A first summarization of the data and transactions related to the one or more applications may later be initiated but the pause can be enforced on the first summarization. Data and transactions available for summarization can be evaluated in response to and based on the request and the pause can be released. Releasing the pause can include resuming summarization upon a completion or a timeout of the evaluating of the data and transactions being summarized. That is, in some cases, a determination can be made as to whether the pause has timed out according to a predetermined timeout limit and in response to determining that pause has timed out, an indication can be recorded that the pause the first summarization has timed out.

Issuing a pause can comprise acquiring a pause identifier for a pause instance and setting an exclusive lock on a scope of the pause instance. A determination can be made as to whether one or more summarizations overlap with the scope of the pause instance. In response to determining that one or more summarizations overlap with the pause instance, a pause indicator can be set for the one or more summarizations and the exclusive lock on the scope of the pause instance can be released.

Figure 6:
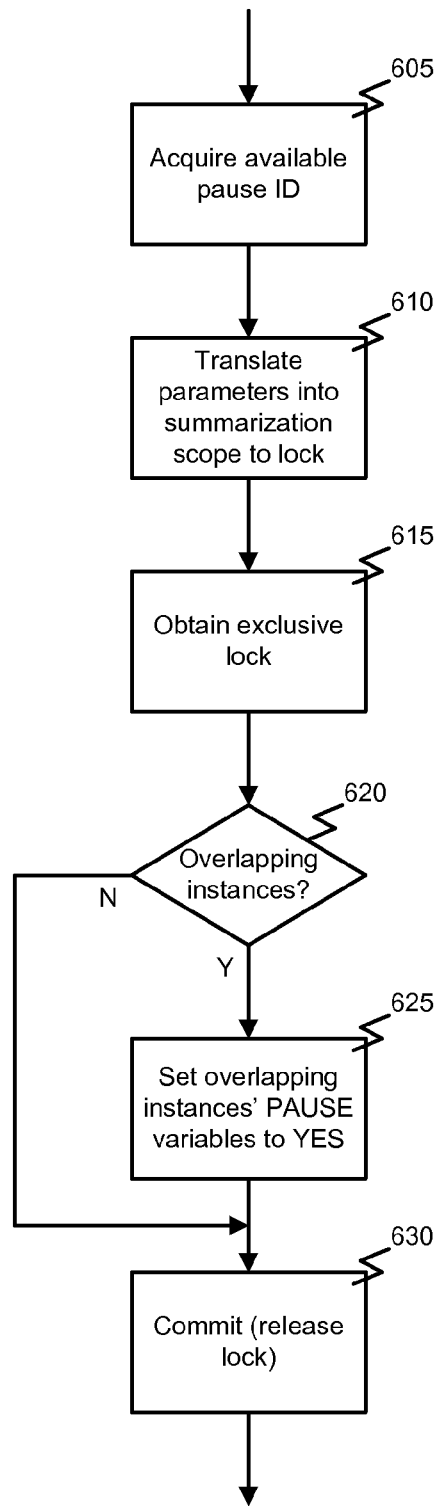
FIG. 6 is a block diagram illustrating a process for pausing a summarization according to one embodiment of the present invention.

FIG. 6 is a block diagram illustrating a process for pausing a summarization according to one embodiment of the present invention. In this example, pausing the summarization can comprise acquiring 605 a pause identifier for a pause instance of the first summarization. Parameters passed to the pause instance can be translated 610 to a scope of the pause instance and an exclusive lock on the scope of the pause instance can be obtained 615. A determination 620 can be made as to whether one or more second summarizations overlap with the pause instance. In response to determining 620 that one or more other summarizations overlap with the pause instance, a pause indicator can be set 625 for the one or more second summarizations. The exclusive lock on the scope of the pause instance can be released.

Figure 7:
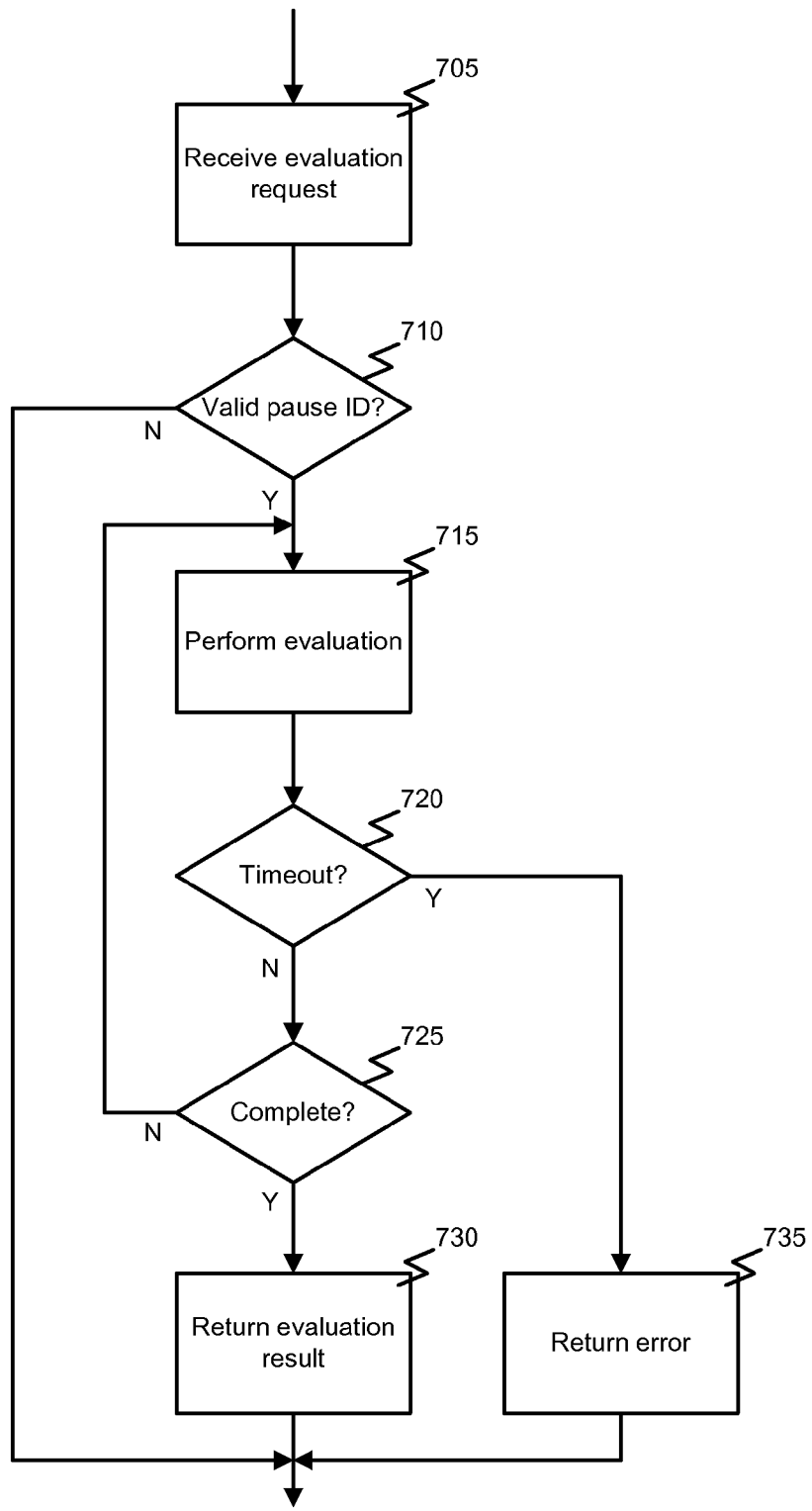
FIG. 7 is a block diagram illustrating a process for evaluating a summarization according to one embodiment of the present invention.

FIG. 7 is a block diagram illustrating a process for evaluating a summarization according to one embodiment of the present invention. In this example, evaluating the data and transactions being summarized can comprise receiving 705 the request to evaluate the data and transactions being summarized. The request can include a pause identifier. A determination 710 can be made as to whether the pause identifier from the request is a valid pause identifier for the pause instance of the first summarization. In response to determining 710 the pause identifier from the request is a valid pause identifier for the pause instance of the first summarization, an evaluation identified in the request can be executed 715. Evaluation 715 can continue until a timeout 720, in which case an error can be returned 735 to the requesting application, or completion 725 of the evaluation 715, in which case a result can be returned 730 to the requesting application.

Figure 8:
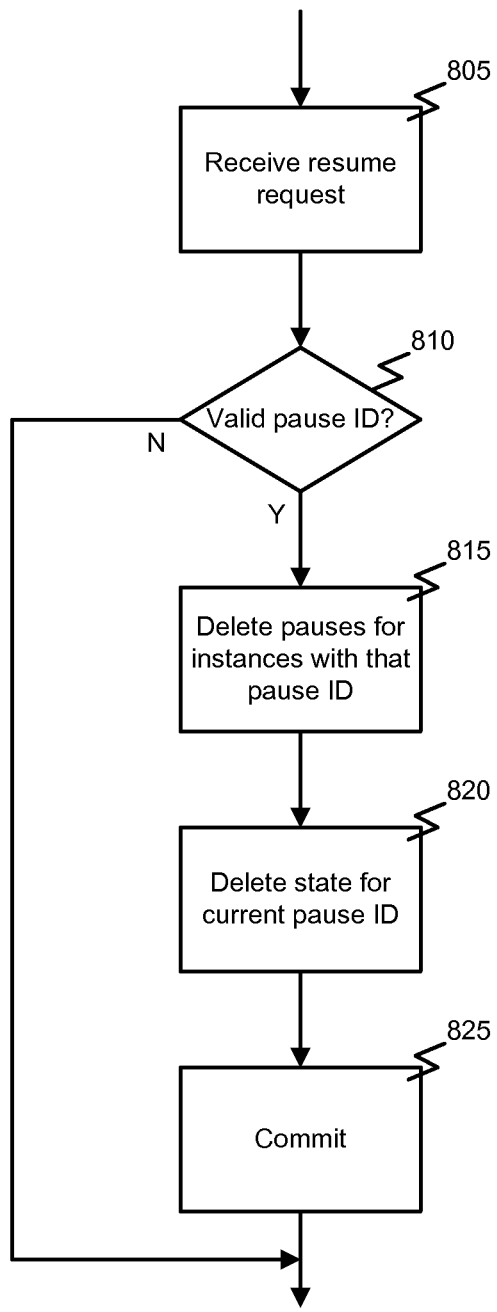
FIG. 8 is a block diagram illustrating a process for resuming a summarization according to one embodiment of the present invention.

FIG. 8 is a block diagram illustrating a process for resuming a summarization according to one embodiment of the present invention. In this example, resuming the first summarization can comprise receiving 805 a request to resume the first summarization, and any other summarizations affected by the pause. The request can include a pause identifier. A determination 810 can be made as to whether the pause identifier from the request is a valid pause identifier for the pause instance of the first summarization. In response to determining 810 the pause identifier from the request is a valid pause identifier for the pause instance of the first summarization, the first summarization can be resumed by deleting 815 any pause indicators for pause instances with the same pause identifier, deleting 820 a state for the current pause identifier, and releasing 825 the exclusive lock on the scope of the pause instance.

Figure 9:
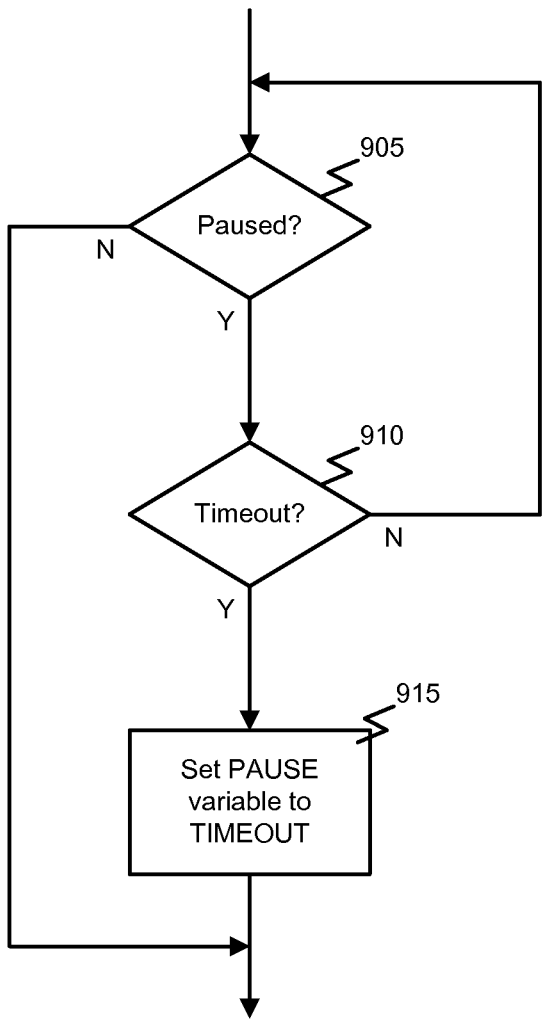
FIG. 9 is a block diagram illustrating a process for handling a pause in a summarization according to one embodiment of the present invention.

FIG. 9 is a block diagram illustrating a process for handling a pause in a summarization according to one embodiment of the present invention. In this example, handling a pause of a first summarization, e.g., by another summarization process or instance, can comprise determining 905 whether the first summarization is currently paused. In response to determining 905 that the first summarization is currently paused, further determination 910 can be made as to whether pausing the first summarization has timed out according to a predetermined timeout limit. In response to determining 910 that pausing the first summarization has timed out, an indication that pausing the first summarization has timed out can be recorded 915. In response to determining 910 that pausing the first summarization has not timed out, the other summarization process or instance can continue to wait for the pause instance until it is no longer paused 905 or until it times out 910.

Figure 10:
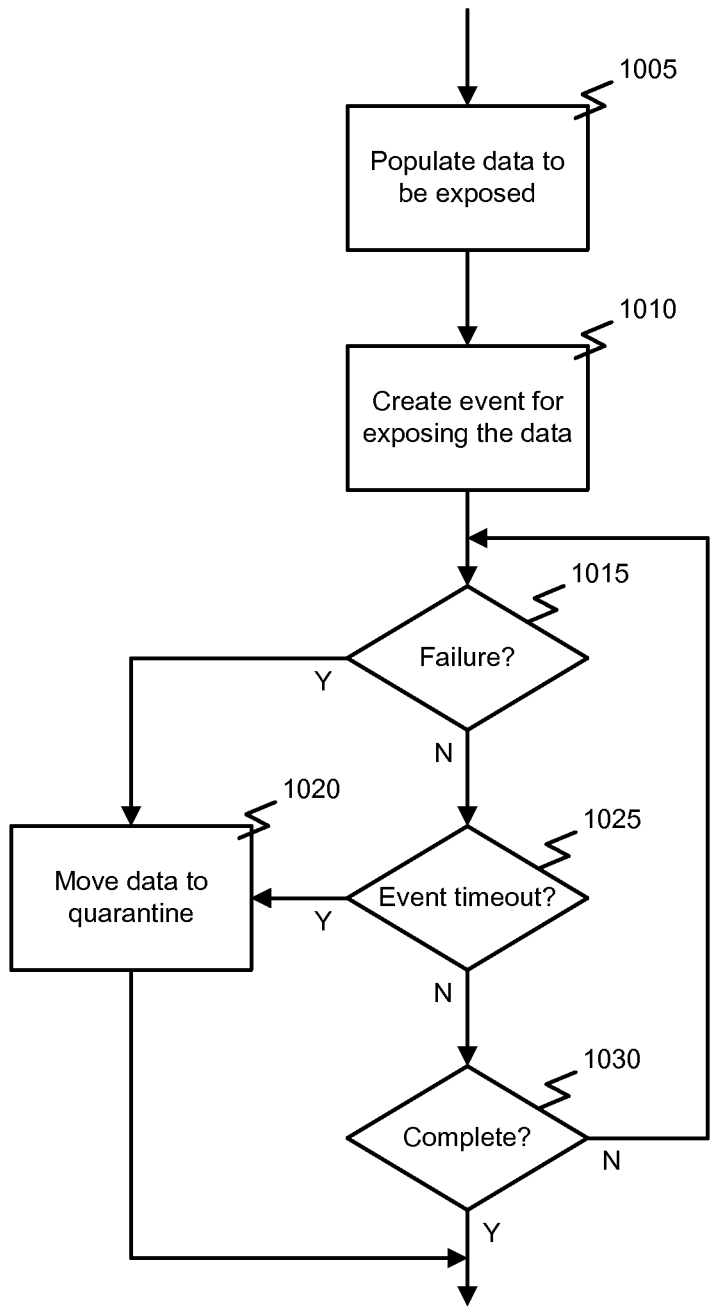
FIG. 10 is a block diagram illustrating a process for performing a summarization with a quarantine according to one embodiment of the present invention.

FIG. 10 is a block diagram illustrating a process for performing a summarization with a quarantine according to one embodiment of the present invention. In this example, initiating a summarization can comprise populating 1005 in a queue the summarization instance with data to be exposed in the summarization. The queue can comprise data to be exposed in one or more summarizations. An event can be created 1010 for exposing the data in the summarization. Determinations 1015, 1025, and 1030 can be made as to the state of the summarization. More specifically, the summarization can continue until complete 1030. However, upon a failure 1015 of the summarization or a timeout 1025 of the event for exposing the data in the summarization, the data to be exposed in the summarization can be moved 1020 from the queue to a quarantine.

Figure 11:
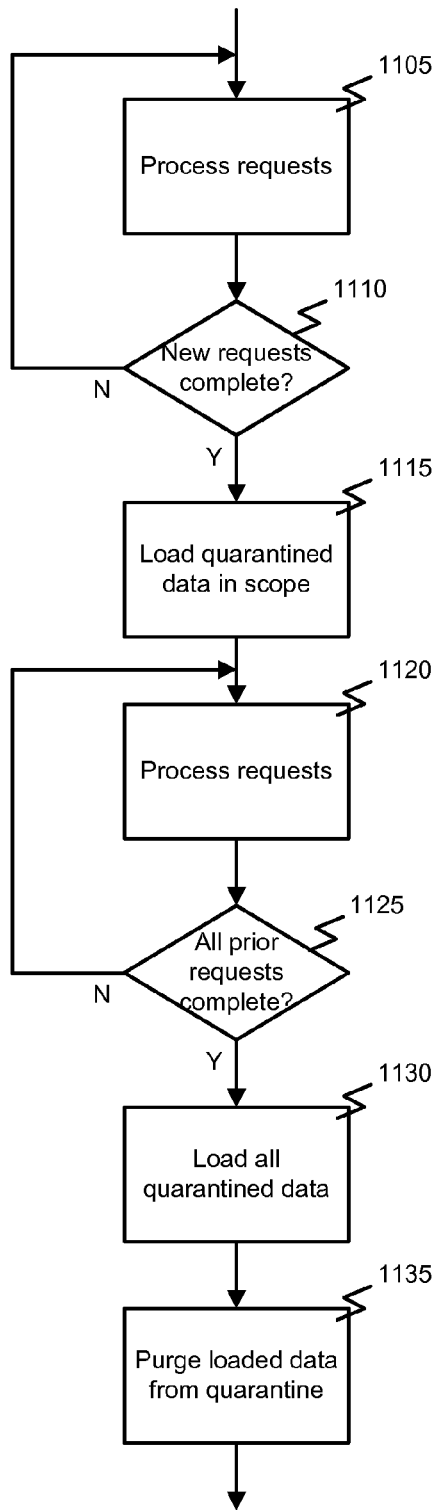
FIG. 11 is a block diagram illustrating a process for processing quarantined data in a summarization according to one embodiment of the present invention.

FIG. 11 is a block diagram illustrating a process for processing quarantined data in a summarization according to one embodiment of the present invention. As illustrated in this example, the queue of data to be exposed can be processed 1105 until a determination 1110 is made that all new requests in the queue have been handled. Upon completion 1110 of processing 1105 the queue of data to exposed, data from the quarantine and in a same scope as the current summarization can be loaded 1115 and processed 1120 until a determination 1125 is made that all in-scope requests in the quarantine have been handled. Upon completion 1125 of processing 1120 data from the quarantine in the same scope as the current summarization, all remaining data from the quarantine can be exposed for processing 1130 by the queue and the loaded 1130 data can be purged 1135 from the quarantine if it was successful.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing summarizations of data and transactions related to one or more applications, the method comprising:
   initiating, by a computer system, a first summarization of the data and transactions related to the one or more applications;
   pausing, by the computer system, the first summarization in response to a request to evaluate the data and transactions being summarized;
   evaluating, by the computer system, data and transactions available for summarization in response to and based on the request; and
   resuming, by the computer system, the first summarization upon a completion or a timeout of the evaluating of the data and transactions being summarized, wherein resuming the first summarization upon a timeout of the evaluating of the data and transactions being summarized comprises determining, by the computer system, whether the first summarization is currently paused, in response to determining that the first summarization is currently paused, further determining, by the computer system, whether pausing the first summarization has timed out according to a predetermined timeout limit, and in response to determining that pausing the first summarization has timed out, recording, by the computer system, an indication that pausing the first summarization has timed out.

2. The method of claim 1, wherein pausing the summarization comprises:
   acquiring a pause identifier for a pause instance of the first summarization;
   translating parameters passed to the pause instance to a scope of the pause instance;
   obtaining an exclusive lock on the scope of the pause instance;
   determining whether one or more second summarizations overlap with the pause instance;
   in response to determining that one or more other summarizations overlap with the pause instance, setting a pause indicator for the one or more second summarizations; and
   releasing the exclusive lock on the scope of the pause instance.

3. The method of claim 2, wherein evaluating the data and transactions being summarized comprises:
   receiving the request to evaluate the data and transactions being summarized, the request including a pause identifier;
   determining whether the pause identifier from the request is a valid pause identifier for the pause instance of the first summarization; and
   in response to determining the pause identifier from the request is a valid pause identifier for the pause instance of the first summarization, executing an evaluation identified in the request.

4. The method of claim 2, wherein resuming the first summarization comprises:
   receiving a request to resume the first summarization, and any other summarizations affected by the pause, the request including a pause identifier;
   determining whether the pause identifier from the request is a valid pause identifier for the pause instance of the first summarization; and
   in response to determining the pause identifier from the request is a valid pause identifier for the pause instance of the first summarization, deleting any pause indicators for pause instances with the same pause identifier and releasing the exclusive lock on the scope of the pause instance.

5. The method of claim 1, wherein executing the first summarization further comprises:
   populating in a queue the first summarization instance with data to be exposed in the first summarization, the queue comprising data to be exposed in one or more summarizations;
   creating an event for exposing the data in the first summarization; and
   upon a failure of the first summarization or a timeout of the event for exposing the data in the first summarization, copying the data to be exposed in the first summarization from the queue to a quarantine.

6. The method of claim 5, further comprising:
   processing, by the computer system, the queue of data to be exposed;
   upon completion of processing the queue of data to exposed, processing, by the computer system, data from the quarantine in a same scope as the first summarization; and
   upon completion of processing data from the quarantine in the same scope as the first summarization, loading, by the computer system, all data from the quarantine into the queue and purging the loaded data from the quarantine.

7. A method for providing summarizations of data and transactions related to one or more applications, the method comprising:
   issuing a pause, by a computer system, in response to a request to evaluate the data and transactions being summarized;
   initiating, by the computer system, a first summarization of the data and transactions related to the one or more applications;
   enforcing, by the computer system, the pause on the first summarization;
   evaluating, by the computer system, data and transactions available for summarization in response to and based on the request; and
   releasing the pause, by the computer system, wherein releasing the pause includes resuming the first summarization upon a completion or a timeout of the evaluating of the data and transactions being summarized, wherein releasing the pause upon a timeout of the evaluating of the data and transactions being summarized comprises determining, by the computer system, whether the pause has timed out according to a predetermined timeout limit and in response to determining that the pause has timed out, recording, by the computer system, an indication that the pause has timed out.

8. The method of claim 7, wherein issuing a pause comprises:
  acquiring a pause identifier for a pause instance;
  obtaining an exclusive lock on a scope of the pause instance;
  determining whether one or more summarizations overlap with the scope of the pause instance;
  in response to determining that one or more summarizations overlap with the pause instance, setting a pause indicator for the one or more summarizations; and
  releasing the exclusive lock on the scope of the pause instance.

9. The method of claim 8, wherein evaluating the data and transactions being summarized comprises:
  receiving the request to evaluate the data and transactions being summarized, the request including a pause identifier;
  determining whether the pause identifier from the request is a valid pause identifier for the pause instance; and
  in response to determining the pause identifier from the request is a valid pause identifier for the pause instance, executing an evaluation identified in the request.

10. The method of claim 8, wherein resuming the first summarization comprises:
  receiving a request to resume the pause instance, the request including a pause identifier;
  determining whether the pause identifier from the request is a valid pause identifier for the pause instance; and
  in response to determining the pause identifier from the request is a valid pause identifier for the pause instance, deleting any pause indicators for pause instances with the same pause identifier and releasing the exclusive lock on the scope of the pause instance.

11. A system comprising:
  a processor; and
  a memory communicatively coupled with and readable by the processor and having stored therein a sequence of instructions which, when executed by the processor, cause the processor to provide summarizations of data and transactions related to one or more applications by initiating a first summarization of the data and transactions related to the one or more applications, pausing the first summarization in response to a request to evaluate the data and transactions being summarized, evaluating data and transactions available for summarization in response to and based on the request, and resuming the first summarization upon a completion or a timeout of the evaluating of the data and transactions being summarized, wherein resuming the first summarization upon a timeout of the evaluating of the data and transactions being summarized comprises determining whether the first summarization is currently paused, in response to determining that the first summarization is currently paused, further determining whether pausing the first summarization has timed out according to a predetermined timeout limit, and in response to determining that pausing the first summarization has timed out, recording an indication that pausing the first summarization has timed out.

12. The system of claim 11, wherein pausing the summarization comprises:
  acquiring a pause identifier for a pause instance of the first summarization;
  translating parameters passed to the pause instance to a scope of the pause instance;
  obtaining an exclusive lock on the scope of the pause instance;
  determining whether one or more second summarizations overlap with the pause instance;
  in response to determining that one or more other summarizations overlap with the pause instance, setting a pause indicator for the one or more second summarizations; and
  releasing the exclusive lock on the scope of the pause instance.

13. The system of claim 12, wherein evaluating the data and transactions being summarized comprises:
  receiving the request to evaluate the data and transactions being summarized, the request including a pause identifier;
  determining whether the pause identifier from the request is a valid pause identifier for the pause instance of the first summarization; and
  in response to determining the pause identifier from the request is a valid pause identifier for the pause instance of the first summarization, executing an evaluation identified in the request.

14. The system of claim 12, wherein resuming the first summarization comprises:
  receiving a request to resume the first summarization, and any other summarizations affected by the pause, the request including a pause identifier;
  determining whether the pause identifier from the request is a valid pause identifier for the pause instance of the first summarization; and
  in response to determining the pause identifier from the request is a valid pause identifier for the pause instance of the first summarization, deleting any pause indicators for pause instances with the same pause identifier and releasing the exclusive lock on the scope of the pause instance.

15. The system of claim 11, wherein executing the first summarization further comprises:
  populating in a queue the first summarization instance with data to be exposed in the first summarization, the queue comprising data to be exposed in one or more summarizations;
  creating an event for exposing the data in the first summarization; and
  upon a failure of the first summarization or a timeout of the event for exposing the data in the first summarization, copying the data to be exposed in the first summarization from the queue to a quarantine.

16. The system of claim 15, wherein providing summarizations of data and transactions related to one or more applications further comprises:
  processing the queue of data to be exposed;
  upon completion of processing the queue of data to exposed, processing data from the quarantine in a same scope as the first summarization; and
  upon completion of processing data from the quarantine in the same scope as the first summarization, processing all the data from the quarantine.

* * * * *

UNITED STATES PATENT AND TRADEMARK OFFICE
CERTIFICATE OF CORRECTION

PATENT NO.        : 8,600,961 B2                              Page 1 of 1
APPLICATION NO.   : 13/398301
DATED             : December 3, 2013
INVENTOR(S)       : Vermette et al.

It is certified that error appears in the above-identified patent and that said Letters Patent is hereby corrected as shown below:

On the title page, column 2, Item (56) under "Other Publications", line 2, delete "Papter-OLAP" and insert -- Paper-OLAP --, therefor.

In the Specification

In column 3, line 16, delete "data to exposed," and insert -- data to be exposed, --, therefor.

In column 14, line 48, delete "data to exposed," and insert -- data to be exposed, --, therefor.

In the Claims

In column 16, line 34, in Claim 6, after "to" insert -- be --.

In column 18, line 57, in Claim 16, after "to" insert -- be --.

Signed and Sealed this
Tenth Day of June, 2014

Michelle K. Lee
*Deputy Director of the United States Patent and Trademark Office*